Figure 1:
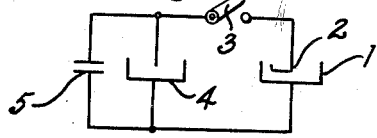

July 1, 1958  T. A. RICH  2,841,716
DOSIMETER
Filed Dec. 16, 1954

Inventor
Theodore A. Rich
by Merton D. Morse
His Attorney

United States Patent Office 2,841,716
Patented July 1, 1958

2,841,716

DOSIMETER

Theodore A. Rich, Schenectady, N. Y., assignor to General Electric Company, a corporation of New York Application December 16, 1954, Serial No. 475,607

11 Claims. (Cl. 250—83.3)

This invention relates to dosimeters for measuring radioactivity by measuring the amount of electrical charge lost in an ionization chamber after the chamber has been exposed to the radioactivity, and more particularly to a dosimeter for measuring both large and small amounts of radiation.

In handling radioactive materials, the health of personnel may be jeopardized unless precautions are taken to see that each individual workman does not receive an amount of radiation over a period of time which would cause permanent damage to be done to his body. One of the best ways to ascertain the amount of radiation to which an individual has been subjected is to have him carry a radiation dosimeter or electrometer which will give a measurement of the radiation to which it has been subjected while being carried upon his person, and thus give a measure of the radiation to which he has been exposed.

One type of dosimeter or electrometer that is used to determine the amount of radiation to which it has been subjected is the one disclosed in vol. I of Radiological Defense, page 125, published by the War and Navy Departments in 1948, a copy of which can be obtained from the Department of Defense, Armed Forces Service Weapons Project, P. O. Box 2610, Washington, D. C. As will be seen from this publication, a dosimeter can be about the size of a large lead pencil and comprise a pair of metal coated quartz fibers within a metal tube or case, the fibers having a capacitance relative to the case and being electrostatically charged relative thereto. As these fibers are exposed to radiation, they gradually lose their electrostatic charge and move relative to one another. A lens system and a scale are provided for measuring the extent of the fiber movement and thus to indicate the amount of radiation to which the dosimeter has been subjected.

While dosimeters such as the foregoing may be adequate for workers with radioactive materials, a dosimeter for defense work has two contradictory requirements. It should be able to indicate large amounts of radiation because the conditions of its use are not normal, and it can be expected that personnel will be worked to the maximum safe exposure. An instrument reading large values of radiation, however, would be useful only immediately after the bursting in the air of an atomic bomb, or possibly for several days after an underground or underwater bomb-burst. Except for such abnormal conditions, the dosimeter, in order to be of any value, must also be very sensitive to indicate much smaller amounts of radiation, particularly for training purposes. It would therefore be extremely desirable to incorporate into a single dosimeter utilizing a single scale, the ability to change the full scale reading from a small to a large value, while still maintaining the dosimeter size extremely small so that it can be readily carried on the person of a worker.

It is, therefore, one object of this invention to provide a dosimeter for measuring large and small amounts of radiation.

It is another object of this invention to provide a dosimeter for measuring small as well as large amounts of radiation upon a single scale.

It is a further object of this invention to provide an extremely small dosimeter for measuring small as well as large amounts of radiation upon a single scale.

Other objects and advantages will appear as the description of the invention proceeds.

In accordance with the invention, a dosimeter is disclosed incorporating therewithin a pair of ion chambers, one of which can provide a larger radiation measuring range than the other. The larger range of one chamber is preferably achieved by incorporating therein a comparatively large capacitor. The smaller range includes a capacitor that is formed between the walls of one ion chamber and the movable quartz fibers of an electrometer, the large capacitor being disposed within the other ion chamber. There is also provided a switch by means of which both capacitors can be connected in parallel. At the beginning of the day, both capacitors would be charged and then used with the switch open. Under these conditions, the indicator of the dosimeter would read small amounts of radiation. However, when it was found that large amounts of radiation were present, as indicated by the discharge of the smaller capacitor, the switch would be closed and the amount of discharge of the large capacitor could then be read on the dosimeter. The closing of the switch recharges the small capacitance from the large one, so that the switch may be reopened and small amounts of radiation can then still be accurately read. Thus a dosimeter is provided which can be used under normal as well as under disaster conditions.

Figure 2:
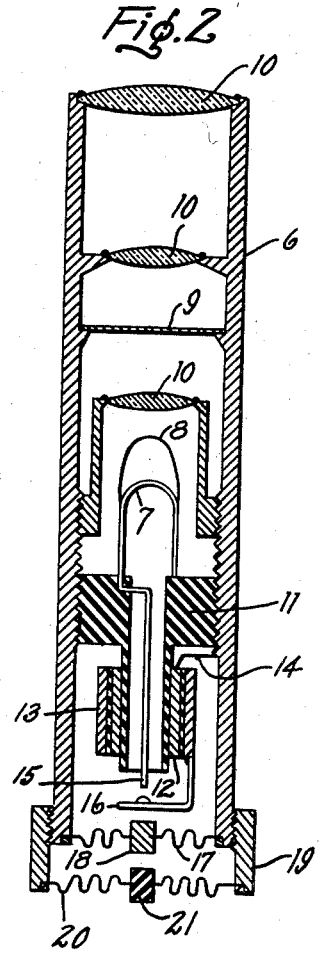

The features of this invention which are believed to be novel and patentable are pointed out in the claims which form a part of this specification. For a better understanding of the invention, reference is made in the following description to the accompanying drawing, wherein like parts are indicated by like reference numerals in which:

Fig. 1 is a schematic diagram of the invention; and
Fig. 2 is a view, in cross section, showing an embodiment of the invention.

Referring now to Fig. 1, there is shown a schematic diagram of the present invention. As shown therein, an ion chamber 1 is provided having disposed therein a vane type of electrometer 2. Connected in parallel with chamber 1, through a switch 3, is shown a second ion chamber 4, having a capacitor 5 connected thereacross. Capacitor 5 has a larger capacitance than the capacitance formed between electrometer elements 2 and the walls of chamber 1. The ion chamber 4 itself has a small capacitance which is in parallel with capacitor 5 and therefore only serves to increase slightly the total capacitance associated with this ion chamber. This figure discloses the principles upon which the present invention operates.

Both the capacitors mentioned above are first charged to a given value. With switch 3 open, the smaller capacitance formed by elements 1 and 2 will be substantially discharged by a small amount of radiation; and the resultant movement of element 2 due to the discharge of this capacitance can be optically observed and measured upon a scale. When the user of this instrument finds that this capacitance has been substantially discharged, he closes switch 3. This places the two ion chambers and their capacitances in parallel with one another and now element 2 will tend to return to its original position, which original position indicated that the capacitances were fully charged. However, the capacitance of element 5 has also been partially discharged due to the presence of radiation, and element 2 will not return completely to its original position. The extent of the return of element 2 will depend upon the amount that the second capacitance has been discharged. Since the second capacitance is much larger than the first capacitance, it takes a much greater amount of radiation to substantially discharge it, and therefore the extent of return indicates the total amount of radiation received. Thus it will be seen that the same scale provides a reading of small amounts of radiation when switch 3 is open and large amounts of radiation when switch 3 is closed.

To give a practical example of how the principles of this invention can be embodied into a dosimeter, several presumptions should be made. Let $C_1$ be equal to the capacitance between elements 1 and 2, and assume it to be 3 statfarads; let $M_1$ be equal to the volume of chamber 1, and assume that it has a value of 6 cubic centimeters; let $C_2$ be equal to the total capacitance of element 5 and ion chamber 4, and assume that it has a value of 1,000 statfarads; and $M_2$ equal the volume of chamber 4 and assume that it has a value of 2 cubic centimeters. Let it also be assumed that both $C_1$ and $C_2$ are charged to a value V equal to 0.5 statvolts.

Now $Q_1$, the charge on the capacitor formed by elements 1 and 2 is equal to $C_1V = 3 \times 0.5 = 1.5$ statcoulombs; and $Q_2$, the charge on ion chamber 4 and capacitor 5 is equal to $C_2V = 1000 \times 0.5 = 500$ statcoulombs. To determine the amount of radiation necessary to substantially discharge $C_1$, we use the equation, $R_1 \times M_1 = 1.5$ statcoulombs $= Q_1$ and for $C_2$ the equation, $R_2 \times M_2 = 500$ statcoulombs $= Q_2$; where $R_1$ and $R_2$ are in Roentgens, which are defined as the amount of radiation required to liberate one statcoulomb of charge per cubic centimeter of air. Solving for $R_1$ and $R_2$, we find $R_1$ equal to 0.25 Roentgen and $R_2$ equal to 250 Roentgens.

From this discussion, it will be apparent that two chambers having the volumes and capacitances set forth above will provide, in the manner set forth above with regard to Fig. 1, a full scale reading of 0.25 Roentgen when switch 3 is opened and a full scale reading of 250 Roentgens which switch 3 is closed, thus fulfilling the objects of this invention.

Referring now to Fig. 2, there is shown a cross sectional view of a practical embodiment of the device shown in Fig. 1. This device includes a metal case or tube 6 within which are disposed a pair of metal coated quartz fibers 7 and 8, these fibers corresponding to element 2 of Fig. 1. Quartz fiber 7 is thicker than fiber 8 and consequently it remains fixed in position while fiber 8 can be moved relative thereto by electrostatic force. The movement of fiber 8 is measured upon a transparent scale 9 disposed above the fibers and having measuring markings thereupon. This scale may be made of glass and have its markings etched thereupon. A series of lenses 10 are provided above the fibers to magnify the movement of fiber 8 so as to permit an observer to note the position of this fiber relative to scale 9, these lenses being supported from the tube 6 of the dosimeter.

The quartz fibers are supported by a high grade insulator 11 which screws into tube 6. Only the very best insulators such as amber, sulphur or polystyrene are suitable, the maintenance of high insulation being vital because the quantities of electricity are extremely small. Disposed around the bottom of insulator 11 is a large capacitor formed between an inner layer of conductive foil 12 and an outer layer of conductive foil 13, the layers being separated by an insulator and being wrapped around insulator 11. Only two layers are shown, although more could be used. Layer 12 is connected by means of a lead 14 to tube 6.

Insulator 11 has a hollow portion therein through which extends a conductive rod 15 which is coupled to quartz fibers 7 and 8. Extending from the outer layer 13 is a flexible conductive contact 16, having its contact point in opposition with rod 15. Closing the bottom end of tube 6 is a flexible translucent diaphragm 17 having a button type of conductor 18 opposite contact 16. Tube 6 is also adapted to receive a cap 19 which may be screwed on over its bottom end and which has therein a flexible, translucent diaphragm 20 with a button type of insulator 21 opposite contact 18. Diaphragms 17 and 20 should be translucent to admit light for the optical system of the dosimeter, and they may be made of a material such as polyethylene.

The capacitance between fibers 7, 8 and rod 15 and their surrounding elements form the capacitance $C_1$ noted above; and these fibers are disposed in an ion chamber corresponding to volume $M_1$. The capacitance between layers 12 and 13 and their surrounding elements corresponds to $C_2$ above, the chamber in which capacitor 12, 13 is placed having a volume $M_2$.

At the beginning of the day, it is desired to charge both capacitances $C_1$ and $C_2$. This is accomplished by connecting a battery between contact 18 and tube 6 and depressing contact 18 into tube 6 until it moves contact 16 against rod 15. This will place the battery voltage across foil layers 12 and 13 as well as across fibers 7 and 8 and tube 6. Consequently, capacitances $C_1$ and $C_2$ will be charged to the full value of the battery. Where $C_1$, $C_2$, $M_1$, and $M_2$ have the values noted above, the battery should provide a voltage equal to 150 volts; since one statvolt is equal to 299.8 volts and it is desired to charge capacitors $C_1$ and $C_2$ to a value of 0.5 statvolt, which is approximately equal to 150 volts.

Once the capacitors are fully charged, cap 19 is placed over the end of tube 6 and the dosimeter is carried upon the person of the worker. The worker looks through lenses 10 and upon scale 9 he will read the extent of the discharge of $C_1$ due to the presence of any radiation in the air. If the worker finds that fiber 8 is reading its full scale value, indicating that $C_1$ is substantially discharged, he depresses insulator button 21 so that it in turn can depress contact button 18 to connect contact 16 to rod 15. By so depressing contact 21, the charge remaining upon $C_2$, which capacitance was formed by elements 12 and 13, is now placed between fibers 7 and 8 and tube 6. The operator then notes where the scale position of fiber 8 now is, and this tells him the total charge that he has received. Having determined the total radiation to which he has been exposed, the operator releases contact 21; and since he has recharged $C_1$, the capacitance between fibers 7 and 8 and tube 6, the dosimeter is once again ready to read small amounts of radiation. This recharge of $C_1$ will of course introduce some error in the scale reading of the dosimeter since it is not recharged to its original value. However, 10 such readings of large amounts of radiation will only cause an error of 3% in the small readings taken thereafter.

From the foregoing, it will be readily apparent that a portable, extremely small dosimeter has been disclosed which enables a person carrying it to read both small and large amounts of radiation; thereby combining two instruments into one. This instrument is also very sturdy and highly resistant to shock. Moreover, it is not affected by humidity and is sufficiently sealed so as to permit readings to be taken in the rain. This dosimeter can be read in the field by day or night and it has a leakage of less than 1% per day after it is charged. The cost of this instrument is also extremely low. Moreover, by noting the speed of the discharge of the smaller capacitance, the Roentgens per hour of a strong field can be estimated, so that the instrument can also be used as a rate meter.

It should be understood that the present invention is not limited to a dosimeter incorporating the dimensions noted above, but that many other dimensions can be used, according to the amount of radiation it is desired to read, and the dimensions of the various elements of the invention can be varied by those skilled in the art as desired. Moreover, this invention is not limited to any special type of indicating device, since many such devices for indicating radiation are known to the art, as noted by the reference publication cited above, and such devices could be readily incorporated into the present invention, in accordance with the principles outlined above.

While there has been described what is at present considered a preferred embodiment of the invention, it will be obvious to those skilled in the art that various changes and modifications may be made therein without departing from the invention; and it is aimed in the appended claims to cover all such changes and modifications as fall within the true spirit and scope of the invention.

What I claim as new and desire to secure by Letters Patent of the United States is:

1. A dosimeter comprising, first radiation sensitive capacitor means adapted to be electrostatically charged and to be substantially discharged by a small amount of radiation impinging thereupon, second radiation sensitive capacitor means adapted to be electrostatically charged and to be substantially discharged by a large amount of radiation impinging thereupon, means coupled to said first capacitor means for measuring the extent of discharge thereof, and switch means for selectively connecting said first and second capacitor means in parallel.

2. A dosimeter comprising, first radiation sensitive capacitor means adapted to be electrostatically charged and to be substantially discharged by a small amount of radiation impinging thereupon, second radiation sensitive capacitor means adapted to be electrostatically charged and to be substantially discharged by a large amount of radiation impinging thereupon, means forming part of said first capacitor means for measuring the extent of discharge thereof, and switch means for selectively connecting said first and second capacitor means in parallel.

3. A dosimeter comprising, first ion chamber means adapted to be electrostatically charged and to be substantially discharged by a small amount of radiation impinging thereupon, second ion chamber means adapted to be electrostatically charged and to be substantially discharged by a large amount of radiation impinging thereupon, means forming part of said first ion chamber means for measuring the extent of discharge thereof, and switch means for selectively connecting said first and second ion chamber means in parallel with one another.

4. A dosimeter comprising, first ion chamber means adapted to be electrostatically charged and to be substantially discharged by a small amount of radiation impinging thereon, second ion chamber means adapted to be electrostatically charged and to be substantially discharged by a large amount of radiation impinging thereupon, means forming part of said first ion chamber means for measuring the extent of discharge thereof, and switch means for selectively connecting said first and second ion chamber means in parallel with one another, said second ion chamber means including a large capacitor for storing a large electrostatic charge.

5. A dosimeter comprising, fiber means, tube means enclosing said fiber means and forming therewith a first capacitor adapted to be electrostatically charged and to be substantially discharged by a small amount of radiation impinging thereupon, said fiber means indicating by its position the extent of said discharge, a second capacitor within said tube and adapted to be electrostatically charged and to be substantially discharged by a large amount of radiation, and switch means for selectively connecting said first and second capacitors in parallel with one another.

6. A dosimeter comprising, fiber means, tube means enclosing said fiber means in a first ion chamber and forming therewith a first capacitor adapted to be electrostatically charged and to be substantially discharged by a small amount of radiation impinging thereupon, said fiber means indicating by its position the extent of said discharge, said tube means having therein a second ion chamber forming a second capacitor adapted to be electrostatically charged and to be substantially discharged by a large amount of radiation, and switch means for selectively connecting said first and second capacitors in parallel with one another.

7. A dosimeter comprising, fiber means, tube means enclosing said fiber means in a first ion chamber and forming therewith a first capacitor adapted to be electrostatically charged and to be substantially discharged by a small amount of radiation impinging thereupon, said fiber means indicating by its position the extent of said discharge, said tube means having therein a second ion chamber within which is a large second capacitor and thereby being adapted to be electrostatically charged and to be substantially discharged by a large amount of radiation, and switch means for selectively connecting said first and second capacitors in parallel with one another.

8. A dosimeter comprising, fiber means, tube means enclosing said fiber means in a first ion chamber and forming therewith a first capacitor adapted to be electrostatically charged and to be substantially discharged by a small amount of radiation impinging thereupon, said fiber means indicating by its position the extent of said discharge, said tube means having therein a second ion chamber within which is a large second capacitor having one end connected to said tube means, said second ion chamber thereby being adapted to be electrostatically charged and to be substantially discharged by a large amount of radiation, and switch means for selectively connecting said first and second capacitors in parallel with one another.

9. A dosimeter comprising, fiber means, tube means enclosing said fiber means in a first ion chamber and forming therewith a first capacitor adapted to be electrostatically charged and to be substantially discharged by a small amount of radiation impinging thereupon, said fiber means indicating by its position the extent of said discharge, said tube means having therein a second ion chamber within which is a large second capacitor having one end connected to said tube means, said second ion chamber thereby being adapted to be electrostatically charged and to be substantially discharged by a large amount of radiation, and switch means for selectively connecting said first and second capacitors in parallel with one another, said switch means comprising a flexible conductor connected to the other end of said second capacitor and selectively adapted to contact said fiber means.

10. A dosimeter comprising, fiber means, tube means enclosing said fiber means in a first ion chamber and forming therewith a first capacitor adapted to be electrostatically charged and to be substantially discharged by a small amount of radiation impinging thereupon, said fiber means indicating by its position the extent of said discharge, said tube means having therein a second ion chamber within which is a large second capacitor having one end connected to said tube means, said second ion chamber thereby being adapted to be electrostatically charged and to be substantially discharged by a large amount of radiation, and switch means for selectively connecting said first and second capacitors in parallel with one another, said switch means comprising a flexible conductor connected to the other end of said second capacitor and selectively adapted to contact said fiber means, said fiber means being supported from an insulator within said tube means and having an extension in juxtaposition the contact portion of said flexible conductor.

11. A dosimeter comprising, fiber means, sealed tube means enclosing said fiber means in a first ion chamber and forming therewith a first capacitor adapted to be electrostatically charged and to be substantially discharged by a small amount of radiation impinging therupon, said fiber means indicating by its position the extent of said discharge, said tube means having therein a second ion chamber within which is a large second capacitor having one end connected to said tube means, said second ion chamber thereby being adapted to be electrostatically charged and to be substantially discharged by a large amount of radiation, switch means for selectively connecting said first and second capacitor in parallel with one another, said switch means comprising a flexible conductor connected to the other end of said second capacitor and selectively adapted to contact said fiber means, said fiber means being supported from an insulator within said tube means and having an extension in juxtaposition the contact portion of said flexible conductor, and means included within said tube for optically magnifying any movement of said fiber means so as to make the movement more readily visible.

References Cited in the file of this patent

UNITED STATES PATENTS

| | | |
|---|---|---|
| 2,473,542 | Philpott | June 21, 1949 |
| 2,643,343 | Rainwater | June 23, 1953 |